(12) United States Patent
Kozakai

(10) Patent No.: US 8,872,383 B2
(45) Date of Patent: Oct. 28, 2014

(54) CONTACTLESS POWER RECEIVING APPARATUS, POWER RECEIVING METHOD FOR CONTACTLESS POWER RECEIVING APPARATUS AND CONTACTLESS POWER SUPPLYING SYSTEM

(75) Inventor: Osamu Kozakai, Kanagawa (JP)

(73) Assignee: Sony Corporation, Tokyo (JP)

( * ) Notice: Subject to any disclaimer, the term of this patent is extended or adjusted under 35 U.S.C. 154(b) by 1011 days.

(21) Appl. No.: 12/788,868

(22) Filed: May 27, 2010

(65) Prior Publication Data

US 2011/0006612 A1 Jan. 13, 2011

(30) Foreign Application Priority Data

Jul. 7, 2009 (JP) ................. 2009-160360

(51) Int. Cl.
*H01F 27/42* (2006.01)
*H02J 7/02* (2006.01)
(52) U.S. Cl.
CPC ..................... *H02J 7/025* (2013.01)
USPC ........................................................ 307/104
(58) Field of Classification Search
USPC ........................................................ 307/104
See application file for complete search history.

(56) References Cited

U.S. PATENT DOCUMENTS

| 2009/0058361 | A1* | 3/2009 | John | 320/128 |
| 2009/0284227 | A1* | 11/2009 | Mohammadian et al. | 320/137 |
| 2010/0033021 | A1* | 2/2010 | Bennett | 307/104 |
| 2010/0079005 | A1* | 4/2010 | Hyde et al. | 307/104 |
| 2010/0253281 | A1* | 10/2010 | Li | 320/108 |
| 2012/0007437 | A1* | 1/2012 | Fells et al. | 307/104 |

FOREIGN PATENT DOCUMENTS

| JP | 11-168837 | 6/1999 |
| JP | 2004-207137 | 7/2004 |

* cited by examiner

*Primary Examiner* — Jared Fureman
*Assistant Examiner* — Duc M Pham
(74) *Attorney, Agent, or Firm* — Sony Corporation

(57) ABSTRACT

Disclosed herein is a contactless power receiving apparatus, including a resonance element adapted to receive supply of AC power in a contactless fashion by resonance from a resonance element of a power supplying source; an excitation element adapted to receive supply of the AC power by electromagnetic induction from the resonance element; a rectification circuit adapted to generate DC power from the AC power from the excitation element and output the DC power; and a changeover circuit adapted to change over the AC power between a supplied state and a non-supplied state to the rectification circuit.

15 Claims, 10 Drawing Sheets

PRIORITY DEGREE 50% : 50%

PRIORITY DEGREE 60% : 40%

PRIORITY DEGREE 90% : 10%

FIG. 3
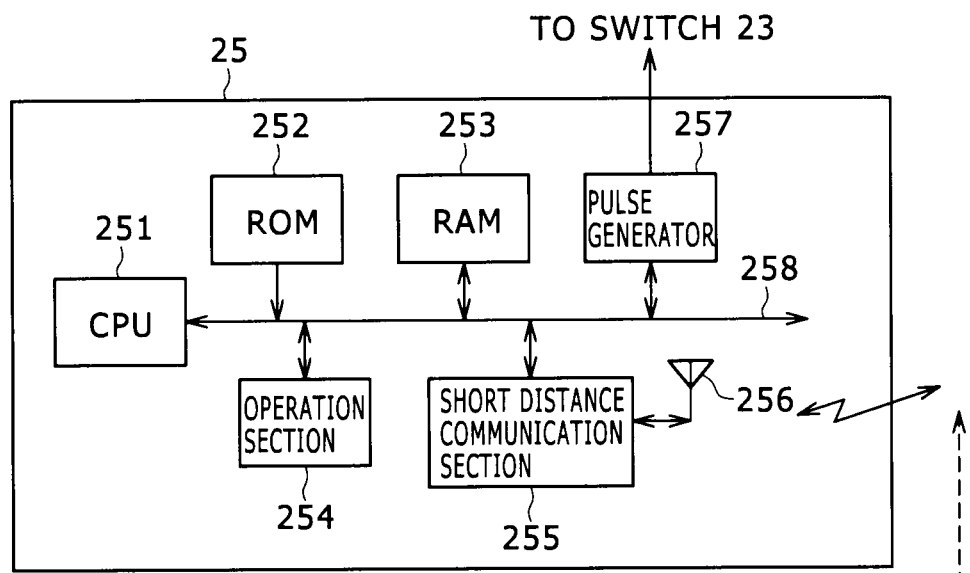
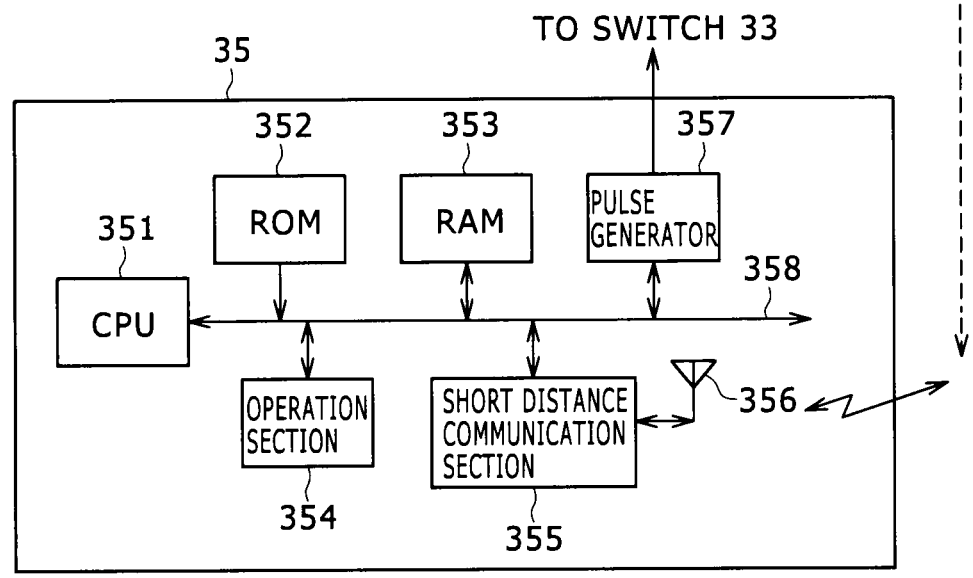

$$fr = \frac{1}{2\pi\sqrt{L \cdot C}} \quad \cdots (1)$$

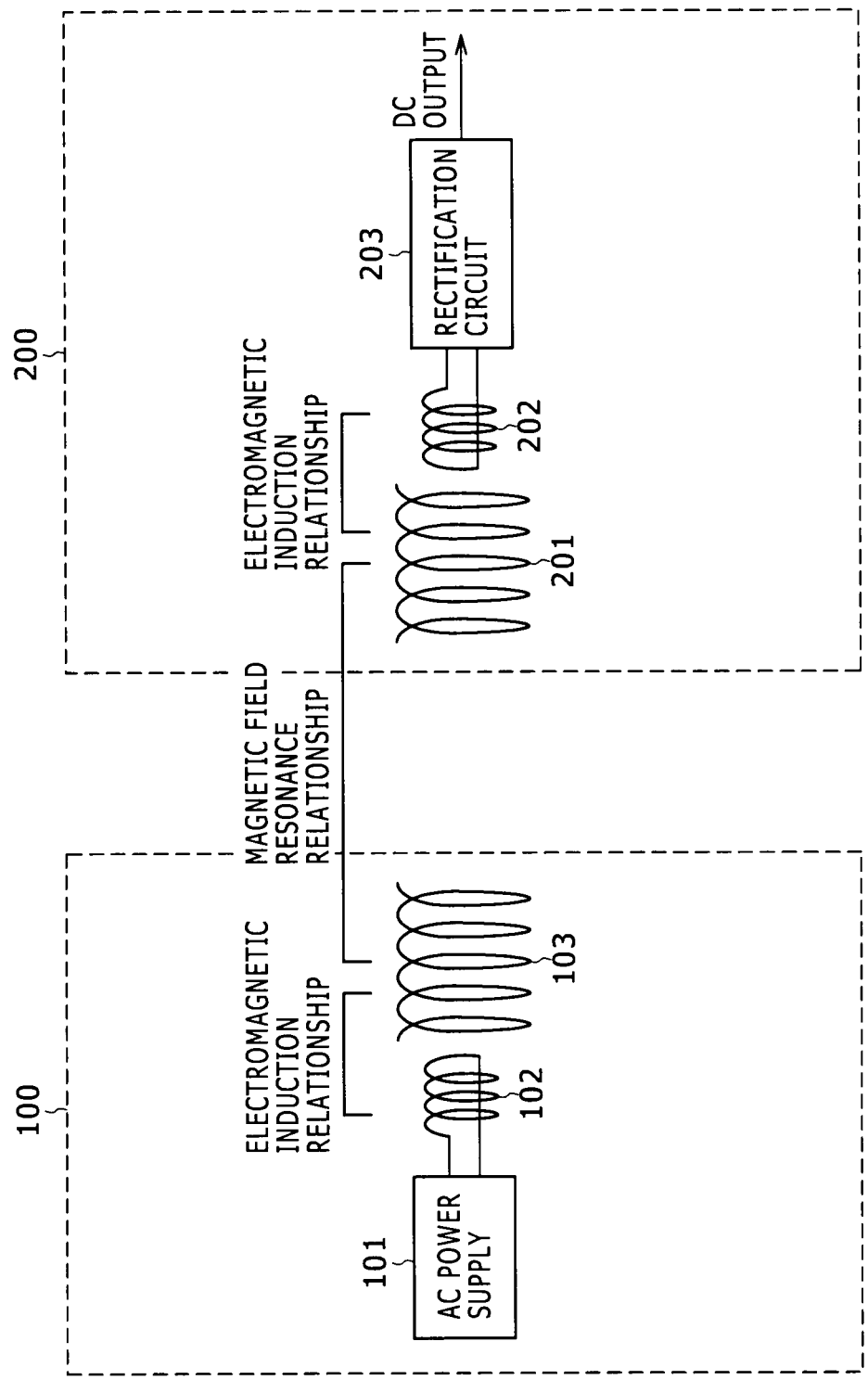

FIG.11

|  | MAGNETIC FIELD RESONANCE TYPE | ELECTROMAGNETIC INDUCTION TYPE |
|---|---|---|
| TRANSMISSION DISTANCE | LONG | SHORT (SUDDENLY ATTENUATES AS DISTANCE INCREASES) |
| DISPLACEMENT BETWEEN TRANSMISSION AND RECEPTION COILS | HIGH EFFICIENCY IS MAINTAINED REGARDLESS OF DISPLACEMENT IN POSITION AND ANGLE | ATTENUATES SUDDENLY |
| FREQUENCY SELECTIVITY | YES | NO |
| 1 TO n POWER SUPPLY | PERMITTED | DIFFICULT (ATTRIBUTABLE TO DISTANCE) |

FIG.12

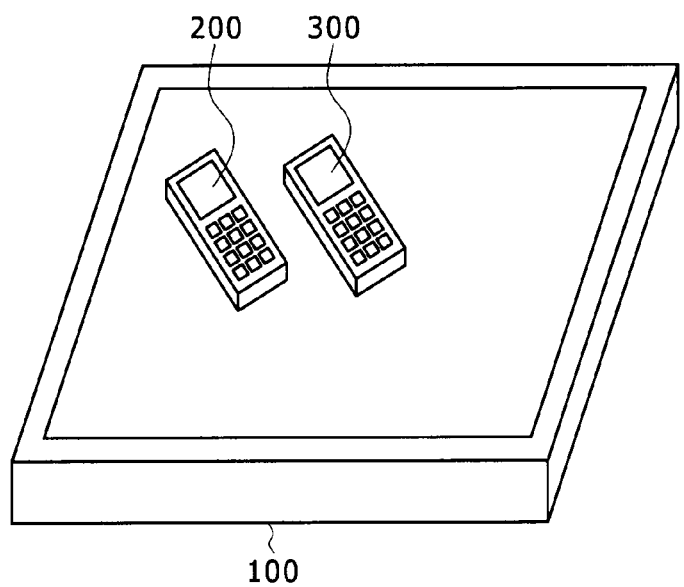

CONTACTLESS POWER RECEIVING APPARATUS, POWER RECEIVING METHOD FOR CONTACTLESS POWER RECEIVING APPARATUS AND CONTACTLESS POWER SUPPLYING SYSTEM

BACKGROUND OF THE INVENTION

1. Field of the Invention

This invention relates to a contactless power receiving apparatus for receiving supply of power using magnetic field resonance, a power receiving method for the contactless power receiving apparatus and a contactless power supplying system which incorporates the contactless power receiving apparatus and the power receiving method.

2. Description of the Related Art

As a technique for allowing transmission of electric energy in a contactless fashion, an electromagnetic induction method and a magnetic field resonance method are available. The electromagnetic induction method and the magnetic field resonance method have such various differences as described below, and in recent years, attention is paid to energy transmission which uses the magnetic field resonance method.

FIG. 9 shows an example of a configuration of a contactless power supply system of the magnetic field resonance type wherein a power supply source and a power supply object or destination correspond in a one-by-one corresponding relationship to each other. Referring to FIG. 9, the contactless power supplying apparatus of the magnetic field resonance type shown includes a power supply source 100 and a power supply destination 200.

As shown in FIG. 9, the power supply source 100 may be, for example, a charging cradle and includes an AC (alternating-current) power supply 101, an excitation element 102, and a resonance element 103. Meanwhile, the power supply destination 200 may be a portable telephone terminal and includes a resonance element 201, an excitation element 202 and a rectification circuit 203.

Each of the excitation element 102 and the resonance element 103 of the power supply source and the resonance element 201 and the excitation element 202 of the power supply destination is formed from an air-core coil. In the inside of the power supply source 100, the excitation element 102 and the resonance element 103 are coupled strongly to each other by electromagnetic induction. Similarly, in the inside of the power supply destination 200, the resonance element 201 and the excitation element 202 are coupled strongly to each other by electromagnetic induction.

When the self resonance frequencies of the resonance element 103 in the form of an air-core coil of the power supply source 100 and the resonance element 201 in the form of an air-core coil of the power supply destination 200 coincide with each other, the resonance element 103 and the resonance element 201 are placed in a magnetic field resonance relationship, in which the coupling amount is maximum and the loss is minimum.

In particular, the contactless power supply system shown in FIG. 9 operates in the following manner. In particular, first in the power supply source, AC power of a predetermined frequency which is AC current from the AC power supply 101 is supplied to the excitation element 102, in which AC power to the resonance element 103 is induced by electromagnetic induction by the AC power. Here, the frequency of the AC power generated in the AC power supply 101 is equal to the self-resonance frequencies of the resonance element 103 of the power supply source and the resonance element 201 of the power supply destination.

As described hereinabove, the resonance element 103 of the power supply source and the resonance element 201 of the power supply destination are disposed in a relationship of magnetic field resonance. Therefore, with the resonance frequency, AC power is supplied from the resonance element 103 to the resonance element 201 in a contactless fashion.

In the power supply destination 200, the AC power from the resonance element 103 of the power supply source is accepted by the resonance element 201. The AC power from the resonance element 201 is supplied to the rectification circuit 203 through the excitation element 202 by electromagnetic induction and is converted by the rectification circuit 203 into and outputted as DC (direct current) power.

In this manner, AC power is supplied from the power supply source to the power supply destination in a contactless fashion. It is to be noted that the DC power outputted from the rectification circuit 203 is supplied, for example, to a charging circuit to which a battery is connected so that it is used to charge the battery.

The contactless power supply system wherein the power supply source and the power supply destination configured in such a manner as described above with reference to FIG. 9 correspond in a one-by-one corresponding relationship to each other has the following characteristics.

The contactless power supply system has such a relationship between the frequency of the AC power supply and the coupling amount as illustrated in FIG. 10A. As can be recognized from FIG. 10A, even if the frequency of the AC power supply is low or conversely high, the coupling amount is not high but exhibits its maximum amount only at a predetermined frequency with which a magnetic field resonance phenomenon occurs. In other words, the coupling amount exhibits frequency selectivity depending upon the magnetic field resonance.

Further, the contactless power supply system has such a relationship between the distance between the resonance elements 103 and 201 and the coupling amount as illustrated in FIG. 10B. As can be recognized from FIG. 10B, the coupling amount decreases as the distance between the resonance elements increases.

However, even if the distance between the resonance elements is small, the coupling amount is not necessarily great, but at a particular resonance frequency, the coupling amount exhibits a maximum value at a particular distance. Further, it can be recognized from FIG. 10B that a coupling amount higher than a fixed level can be assured if the distance between the resonance elements remains within a certain range.

Further, the contactless power supply system has such a relationship between the resonance frequency and the distance between the resonance elements with which a maximum coupling amount is obtained as illustrated in FIG. 10C. From FIG. 10C, it can be recognized that, where the resonance frequency is low, the distance between the resonance elements is great. Also it can be recognized that, where the resonance frequency is high, a maximum coupling amount is obtained by decreasing the distance between the resonance elements.

In a contactless power supply system of the electromagnetic induction type which is used widely at present, it is necessary for the power supplying source and the power supplying destination to share magnetic fluxes, and in order to send power efficiently, it is necessary for the power supplying source and the power supplying destination to be disposed closely to each other. Also axial registration of the power supplying source and the power supplying destination to be coupled to each other is significant.

Meanwhile, a contactless power supply system which uses a magnetic field resonance phenomenon is advantageous in that, in the contactless power supply system, power can be transmitted over a greater distance than that by the electromagnetic induction method and besides, even if the axial registration is not very good, the transmission efficiency does not drop very much.

From the foregoing, the contactless power supply system of the magnetic field resonance type and the contactless power supply system of the electromagnetic induction type have such differences as listed in FIG. 11. In particular, as seen in FIG. 11, the contactless power supply system of the magnetic field resonance type is tough against displacement between the transmission and reception coils, that is, between the resonance elements and permits a longer transmission distance.

Therefore, the contactless power supply system of the magnetic field resonance type can carry out power supply in such a manner as seen in FIG. 12. In particular, referring to FIG. 12, a plurality of power supply destinations which are portable terminals in FIG. 12 can be placed on a single power supply source which is a power supply cradle in FIG. 12 so that they are charged by the latter.

However, the plural power supply destinations or portable terminals placed on the power supply source or power supply cradle may include a power supply destination which should be charged up rapidly preferentially to the other power supply destinations or a power supply destination which may be charged up, for example, before use of the same is started the following day.

As an existing system which can charge a plurality of power supply destinations in a preferential order in this manner, a battery pack charging adapter of the contact type is disclosed in Japanese Patent Laid-Open No. 2004-207137 (hereinafter referred to as Patent Document 1).

The battery pack charging adapter disclosed in Patent Document 1 can charge a plurality of battery packs at the same time and includes preferential changeover means whose configuration is not particularly disclosed in Patent Document 1 such that it has a function of applying a priority order for charging to the battery packs connected thereto.

Further, as a contactless power supplying system, a charging apparatus for a contactless portable communication apparatus of the electromagnetic induction type is disclosed in Japanese Patent Laid-Open No. Hei 11-168837 (hereinafter referred to as Patent Document 2) although a priority order is not applied to power supply destinations.

In the charging apparatus for a contactless portable communication apparatus disclosed in Patent Document 2, in order to prevent a bad influence on a communication operation of a portable communication apparatus during charging, power supply from the charging apparatus is turned on/off based on information indicative of a timing at which communication from the portable communication apparatus is to be carried out.

With the charging apparatus for a contactless portable communication apparatus disclosed in Patent Document 2, although a priority order is not applied to power supply destinations as described above, the charging apparatus can actually control the charging state of the portable communication apparatus.

SUMMARY OF THE INVENTION

Incidentally, in the battery pack charging adapter of the contact type disclosed in Patent Document 1, the charging adapter side to which a plurality of battery packs are physically connected through connection terminals when it is used controls the priority order for charging the battery packs connected thereto.

On the power supply side, that is, on the power supply cradle side, having the configuration described hereinabove with reference to FIG. 9, a resonance element is not provided for each of portable electronic apparatus placed thereon. Therefore, in the contactless power supply system of the magnetic field resonance type configured in such a manner as described above with reference to FIG. 9, a configuration which can control power supply for each power supply destination may not be provided on the power supplying source 100 side. Consequently, the battery pack charging adapter of the contact type disclosed in Patent Document 1 may not be applied to the contactless power supply system of the magnetic field resonance type.

Also in the charging apparatus for a contactless portable communication apparatus disclosed in Patent Document 2, the charging apparatus side controls the power supply between on and off states based on information from the portable communication terminal side. In other words, also the charging apparatus for a contactless portable communication apparatus disclosed in Patent Document 2 may not be applied to a contactless power supply system of the magnetic field resonance type because the charging apparatus side controls the power supply between on and off states similarly to the battery pack charging adapter of the contact type disclosed in Patent Document 1.

In this manner, in a contactless power supply system of the magnetic field resonance type wherein the power supplying source includes only one resonance element as seen in FIG. 9, the power supplying source may not control the power supplying state of power supply destinations using the technique disclosed in Patent Document 1 or Patent Document 2. Therefore, a contactless power supply system of the magnetic field resonance type has a problem that a priority order for charging may not be applied to individual power supply destinations.

Therefore, it is desirable to provide a contactless power supply system of the resonance type wherein priority degrees can be individually applied to a plurality of power supply destinations each in the form of a contactless power receiving apparatus to which power is supplied from a single power supplying source such that the power supply destinations can receive supply of power from the power supplying source in accordance with the priority degrees.

According to the embodiments of the present invention, there is provided a contactless power receiving apparatus including a resonance element adapted to receive supply of AC power in a contactless fashion by resonance from a resonance element of a power supplying source, an excitation element adapted to receive supply of the AC power by electromagnetic induction from the resonance element, a rectification circuit adapted to generate DC power from the AC power from the excitation element and output the DC power, and a changeover circuit adapted to change over the AC power between a supplied state and a non-supplied state to the rectification circuit.

In the contactless power receiving apparatus, a resonance phenomenon is utilized such that AC power supplied through the resonance element of the power supplying source is received through the resonance element of the power receiving apparatus and supplied to the rectification circuit through the excitation element electromagnetically coupled to the resonance element.

Then, the changeover circuit changes over the AC power between a supplied state and a non-supplied state to the rectification circuit. Consequently, the timing of reception of power can be controlled for each contactless power receiving apparatus and the mode of reception of power can be varied for each contactless power receiving apparatus.

Consequently, each contactless power receiving apparatus can receive and utilize power supplied from the power supplying source in accordance with an intended priority degree.

In summary, each power receiving apparatus which becomes a power supply destination of a contactless power supply system of the resonance type can receive supply of power from the power supplying source in accordance with an intended priority degree thereof.

BRIEF DESCRIPTION OF THE DRAWINGS

FIG. 3 is a block diagram showing a configuration of a control section for controlling a switch circuit of one of the power supply destinations shown in FIG. 1 and a control section for controlling a switch circuit of the other one of the power supply destinations;

FIG. 9 is a diagrammatic view showing an existing contactless power supply system of the magnetic field resonance type;

FIG. 11 is a table illustrating results of comparison between a contactless power supply system of the magnetic field resonance type and a contactless power supply system of the electromagnetic induction type; and FIG. 12 is a schematic view showing a particular example of a contactless power supply system of the magnetic field resonance type.

DETAILED DESCRIPTION OF THE PREFERRED EMBODIMENTS

In the following, apparatus and methods of embodiments of the present invention are described with reference to the accompanying drawings. Although the present invention can be applied to apparatus and methods of various resonance types such as the magnetic field resonance type, electric field resonance type and electromagnetic induction type, the following description is given taking apparatus and methods of the magnetic field resonance type as examples.

FIRST EMBODIMENT

Contactless Power Supply System of the Magnetic Field Resonance Type

Figure 1:
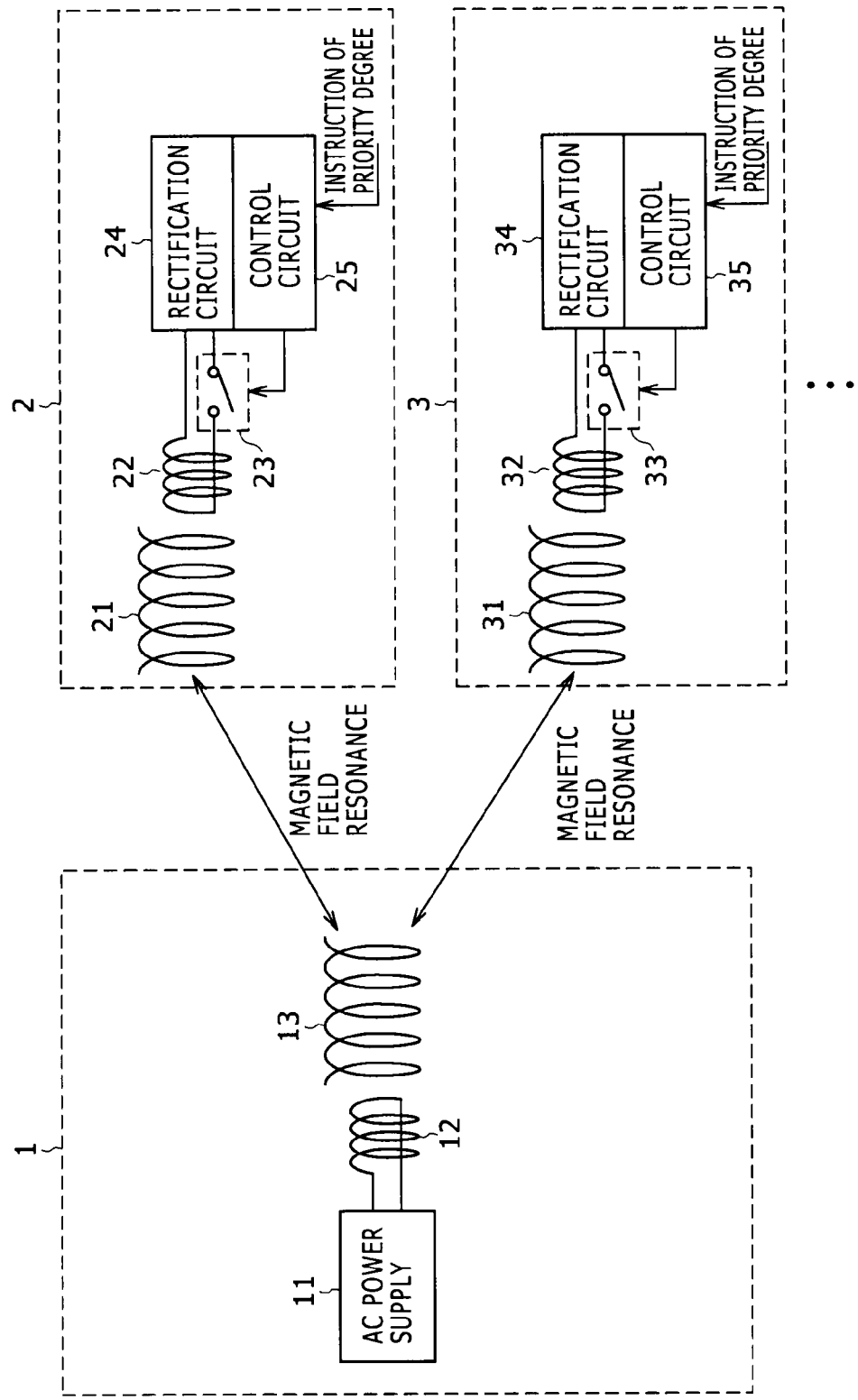
FIG. 1 is a diagrammatic view showing an example of a configuration of a contactless power supplying system in which a contactless power supplying apparatus according to a first embodiment of the present invention is incorporated.

FIG. 1 shows an example of a configuration of a contactless power supply system of the magnetic field resonance type according to the first embodiment of the present invention. Referring to FIG. 1, the contactless power supply system includes a power supply source 1, and a plurality of power supply destinations 2 and 3.

The power supply source 1 is a contactless power supplying apparatus configured as a charging cradle. The power supply source 1 has a mounting table of a size sufficient to allow a plurality of contactless power receiving apparatus, which become power supply destinations such as portable telephone terminals as described hereinabove with reference to FIG. 12, to be placed thereon.

Each of the power supply destinations 2 and 3 is a contactless power supplying apparatus which becomes a power supply destination such as a portable telephone terminal as described hereinabove.

The power supply source 1 includes an AC power supply 11, an excitation element 12 and a resonance element 13. Meanwhile, the power supply destination 2 includes a resonance element 21, an excitation element 22, a switch circuit 23, a rectification circuit 24, and a control circuit 25. Similarly, the power supply destination 3 includes a resonance element 31, an excitation element 32, a switch circuit 33, a rectification circuit 34, and a control circuit 35.

Each of the excitation element 12 and the resonance element 13 of the power supply source 1 is formed from an air-core coil. Also the resonance element 21 and the excitation element 22 of the power supply destination 2 and the resonance element 31 and the excitation element 32 of the power supply destination 3 are each formed from an air-core coil.

The AC power supply 11 of the power supply source 1 generates AC power of a frequency equal to or substantially equal to a self-resonance frequency of the resonance element 13 of the power supply source 1, resonance element 21 of the power supply destination 2 and resonance element 31 of the power supply destination 3 and supplies the generated AC power (AC current) to the excitation element 12.

In particular, in the contactless power supply system of the magnetic resonance type shown in FIG. 1, the resonance element 13 of the power supply source 1, resonance element 21 of the power supply destination 2 and resonance element 31 of the power supply destination 3 have an equal or substantially equal resonance frequency.

Further, the AC power supply 11 of the power supply source 1 includes a Kollwitz type oscillation circuit or a Hartley type oscillation circuit in order to generate AC power of an intended frequency.

The excitation element 12 is excited by AC power from the AC power supply 11 and supplies the AC power to the resonance element 13. The excitation element 12, which receives supply of the AC power from the AC power supply 11, and the resonance element 13 are coupled strongly by electromagnetic induction.

Therefore, AC power from the AC power supply 11 is supplied to the resonance element 13 through the excitation element 12. It is to be noted that, by establishing impedance matching with the AC power supply 11 and the resonance element 13, the excitation element 12 plays a role also of preventing reflection of an electric signal.

The resonance element 13 generates a magnetic field with AC power supplied thereto from the excitation element 12.

The resonance element 13 has inductance and capacitance. The resonance element 13 exhibits the highest magnetic field intensity at a resonance frequency thereof.

Figures 7, 8:
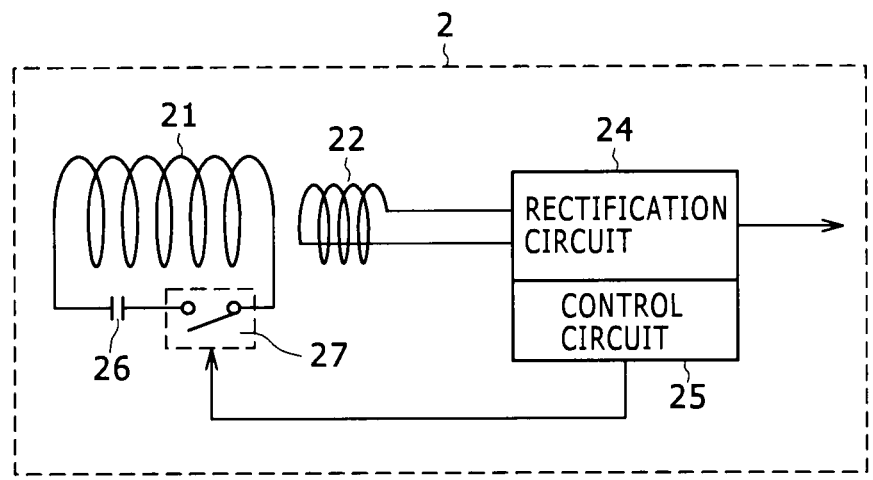
FIG. 7 is a block diagram showing an example of another configuration of a power receiving apparatus of a power supply destination for providing a period within which power supply from a power supplying source is received and another period within which the power supply is not received.
FIG. 8 is a view illustrating an expression for determining a resonance frequency of a resonance element.
Figure 10A:
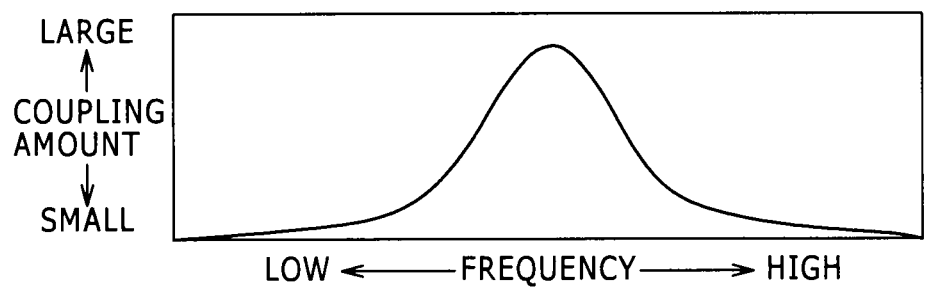
FIGS. 10A, 10B and 10C are graphs illustrating characteristics of a contactless power supply system of the magnetic field resonance type.
Figure 10B:
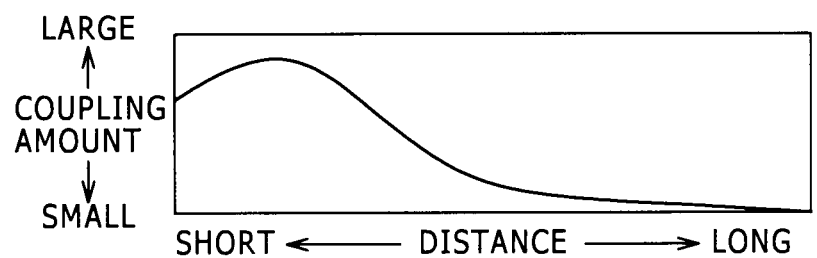
Figure 10C:
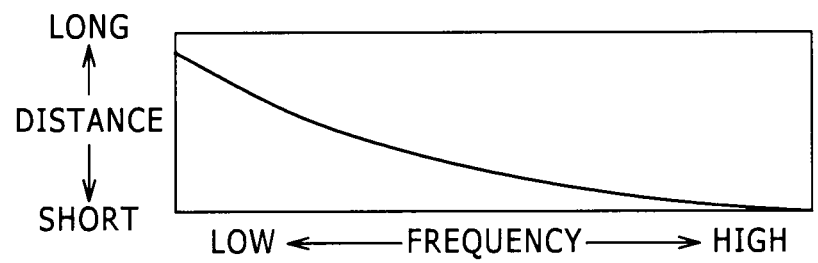

FIG. 8 shows an expression for determining a resonance frequency fr of the resonance element 13. In the expression (1) shown in FIG. 8, the character L represents the inductance which the resonance element 13 has, and the character C represents the capacitance which the resonance element 13 has.

Accordingly, the resonance frequency of the resonance element 13 depends upon the inductance L and the capacitance C which the resonance element 13 has. Since the resonance element 13 is formed from an air-core coil as described hereinabove, the line-to-line capacitance of the resonance element 13 plays a role as the capacitance. The resonance element 13 generates a magnetic field in an axial direction of the coil.

The resonance element 21 of the power supply destination 2 and the resonance element 31 of the power supply destination 3 receive supply of AC power from the power supply source 1 by magnetic field coupling by magnetic field resonance. The resonance element 21 of the power supply destination 2 and the resonance element 31 of the power supply destination 3 have inductance L and capacitance C similarly to the resonance element 13 of the power supply source described hereinabove in connection with the expression (1) of FIG. 8 and have a resonance frequency equal to or substantially equal to that of the resonance element 13 of the power supply source.

Since the resonance element 21 of the power supply destination 2 and the resonance element 31 and the power supply destination 3 have a configuration of an air-core coil as described hereinabove, the line-to-line capacitance plays a role as the capacitance. The resonance element 21 of the power supply destination 2 and the resonance element 31 of the power supply destination 3 are connected to the resonance element 13 of the power supply source 1 by magnetic field resonance as shown in FIG. 1.

Consequently, AC power is supplied by magnetic field resonance from the resonance element 13 of the power supply source 1 to the resonance element 21 of the power supply destination 2 and the resonance element 31 of the power supply destination 3 at the resonance frequency.

Further, as described hereinabove, in the power supply destination 2, the resonance element 21 and the excitation element 22 are coupled to each other by electromagnetic induction, and AC power is supplied from the resonance element 21 to the rectification circuit 24 through the excitation element 22. Similarly, in the power supply destination 3, the resonance element 31 and the excitation element 32 are coupled to each other by electromagnetic induction, and AC power is supplied from the resonance element 31 to the rectification circuit 34 through the excitation element 32.

It is to be noted that, by establishing impedance matching with the resonance element 21 and the rectification circuit 23, the excitation element 22 plays a role also of preventing reflection of an electric signal. Similarly, by establishing impedance matching with the resonance element 31 and the rectification circuit 34, the excitation element 32 plays a role also of preventing reflection of an electric signal.

Though not shown, DC power from each of the rectification circuit 24 and the rectification circuit 34 is supplied to a charging circuit to which a battery is connected so that it is used to charge the battery.

In this manner, in the contactless power supply system of the magnetic field resonance type of the present embodiment, the power supply destination 2 and the power supply destination 3 receive supply of power in a contactless fashion from the power supply source 1 and use the power to charge a battery or for some other application.

The power supply destination 2 in the contactless power supply system of the magnetic field resonance type of the present embodiment further includes a switch circuit 23 interposed between the excitation element 22 and the rectification circuit 24 and a control circuit 25 having a function of controlling on/off operations of the switch circuit 23.

Similarly, the power supply destination 3 in the contactless power supply system of the magnetic field resonance type of the present embodiment further includes a switch circuit 33 interposed between the excitation element 32 and the rectification circuit 34 and a control circuit 35 having a function of controlling on/off operations of the switch circuit 33.

Each of the power supply destinations 2 and 3 has a priority mode and a non-priority mode regarding a charging process. In the priority mode, the switch circuit 23 and the switch circuit 33 are normally kept on so that supply of power can be received from the power supplying source 1 at all times.

On the other hand, in the non-priority mode, supply of power from the power supplying source 1 is received only within a fixed period of time determined in advance which is shorter than a predetermined unit period of time within the unit period of time, for example, such that the switch circuits 23 and 33 have an on state only within 300 milliseconds within one period.

A user of the power supply destinations 2 and 3 would carry out inputting for setting to the power supply destinations 2 and 3 regarding whether the priority mode should be established or the non-priority mode should be established through an operation section not shown prior to charging of the power supply destinations 2 and 3.

The setting input is accepted by the control sections 25 and 35. The control sections 25 and 35 thus control the switch circuits 23 and 33 between on/off states in accordance with the individually set modes.

For example, it is assumed that the power supply destination 2 is set to the priority mode and the power supply destination 3 is set to the non-priority mode. In this instance, the control circuit 25 of the power supply destination 2 controls the switch circuit 23 so as to be normally kept on. On the other hand, the control circuit 35 of the power supply destination 3 controls the switch circuit 33 so as to have an on state within a period of 300 milliseconds for every one second but have an off state except the period.

Consequently, when the switch circuit 23 of the power supply destination 2 is on and the switch circuit 33 of the power supply destination 3 is off, only the power supply destination 2 receives supply of power from the power supplying source 1 so that it is charged preferentially.

Further, also when the switch circuit 23 of the power supply destination 2 is on and also the switch circuit 33 of the power supply destination 3 is on, the power supply destination 2 receives supply of power from the power supplying source 1. In this instance, the power supply destination 3 as well as the power supply destination 2 receives supply of power from the power supplying source 1. Therefore, the receiving amount of power of the power supply destination 2 from the power supplying source 1 decreases. However, the power supply destination 2 can receive supply of power from the power supplying source 1 continuously.

On the other hand, when the switch circuit 33 of the power supply destination 3 is off, the power supply destination 3 does not receive supply of power from the power supplying source 1. However, when the switch circuit 33 of the power supply destination 3 is on, the power supply destination 3 can receive supply of power from the power supplying source 1.

It is to be noted that the switch circuit 23 of the power supply destination 2 is normally kept on as described hereinabove. Therefore, when the switch circuit 33 of the power supply destination 3 is on, also the switch circuit 23 of the power supply destination 2 is on, and both of the power supply destination 2 and the power supply destination 3 receive supply of power. Therefore, the receiving amount of power of each of the power supply destinations 2 and 3 decreases. However, each of the power supply destinations 2 and 3 can continuously receive supply of power as described above.

In this manner, in the charging process, the switch circuit 23 in the power supply destination 2 which is set to the priority mode is normally kept on. Therefore, within a period within which only the switch circuit 23 of the power supply destination 2 is on, the power supply destination 2 receives supply of power preferentially from the power supplying source 1 and therefore can be charged up rapidly.

On the other hand, in the charging process, since the switch circuit 33 of the power supply destination 3 which is set to the non-priority mode is kept on only within the predetermined period of time within a unit period of time, the period of time within which the power supply destination 3 receives supply of power from the power supplying source 1 is shorter than that within which the power supply destination 2 receives supply of power.

However, since the power supply destination 3 can receive supply of power from the power supplying source 1 within a period within which the switch circuit 33 is on, it can receive supply of power from the power supplying source 1 and be charged up although a longer period of time is desired for charging up the same than that desired for charging up the power supply destination 2 in the priority mode.

It is to be noted that, while, in the example described, the power supply destination 2 is set to the priority mode and the power supply destination 3 is set to the non-priority mode, the mode setting is not limited to this, and the power supply destination 3 may be set to the priority mode while the power supply destination 2 is set to the non-priority mode.

Also it is possible to set both of the power supply destinations 2 and 3 to the priority mode. In this instance, since both of the switch circuit 23 of the power supply destination 2 and the switch circuit 33 of the power supply destination 3 are controlled to an on state, power is supplied to both of the power supply destinations 2 and 3.

However, where the number of power supply destinations increases, the received amount of power by each power supply destination from the power supplying source 1 decreases as described hereinabove, and the charging efficiency drops. However, both of the power supply destination 2 and the power supply destination 3 receive supply of power from the power supplying source 1 and can normally carry out charging.

Further, both of the power supply destination 2 and the power supply destination 3 can be placed into the non-priority mode. In this instance, when only the switch circuit 23 of the power supply destination 2 is on, the power supply destination 2 can receive supply of power, but when only the switch circuit 33 of the power supply destination 3 is on, the power supply destination 3 can receive supply of power from the power supplying source 1. Accordingly, a longer period of time is desired to charge up both of the power supply destination 2 and the power supply destination 3 than that when they are placed in the priority mode.

In this manner, the switch circuit 23 of the power supply destination 2 and the switch circuit 33 of the power supply destination 3 can be controlled between on and off states depending upon whether the priority mode is established or the non-priority mode is established without providing a special circuit in the power supplying source 1. Consequently, each power supply destination can establish the priority mode or the non-priority mode for a charging process to carry out charging.

It is to be noted that, while, the number of power supply destinations in the present first embodiment described above is two including the power supply destination 2 and the power supply destination 3, the number of such power supply destination is not limited to two. In other words, the number of power supply destinations may be a plural number equal to or greater than 2.

Also the number of modes relating to the charging process is not limited to two including the priority mode and the non-priority mode but may be a plural number greater than 2. For example, such a plurality of modes as a highest priority mode, a priority mode and a non-priority mode may be used.

In this instance, the period of time within which a switch circuit for changing over supply of AC power to a rectification circuit between on and off states exhibits an on state decreases in the order of the most priority mode, priority mode and non-priority mode. Conversely speaking, the period of time within which the switch circuit for changing over supply of AC power to a rectification circuit is kept on is longest in the highest priority mode, second longest in the priority mode and shortest in the non-priority mode.

Consequently, a priority degree for a charging process can be applied to and by each power supply destination.

SECOND EMBODIMENT

Incidentally, in the first embodiment described hereinabove, if switch circuits in a plurality of power supply destinations for switching regarding whether or not AC power should be supplied to a rectification circuit are placed into an on state, then the power receiving amount by each power supply destination decreases. Therefore, such a situation that the actual charging time becomes longer than charging time estimated in accordance with a priority degree may possibly occur.

Thus, in the present second embodiment, each power supply destination inhibits, when it is receiving supply of power from a power supplying source, any other power supply destination from receiving the power so that the received amount of power by the power supply destination from the power supplying source does not decrease. In other words, each power supply destination can exclusively receive power.

It is to be noted that also the apparatus and the method of the present second embodiment are applied to power supply destinations of a contactless power supply system having a configuration similar to that of the contactless power supply system of the magnetic field resonance type described hereinabove with reference to FIG. 1. Therefore, the contactless power supply system of the magnetic field resonance type of the second embodiment has a configuration similar to that of the contactless power supply system of the magnetic field resonance type described hereinabove with reference to FIG. 1, and description of the same is given below with reference also to FIG. 1.

Also in the contactless power supply system of the magnetic field resonance type of the present second embodiment, a power supply destination 2 and a power supply destination 3 receive supply of power from a power supplying source 1.

However, the power supply time can be controlled exclusively such that, when one of the power supply destinations 2 and 3 is receiving supply of power, the other does not receive supply of power.

Figure 2A:
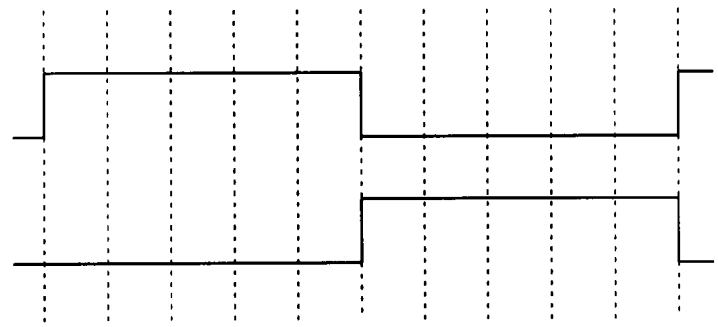
FIGS. 2A, 2B and 2C are timing charts illustrating particular examples of a mode where two different power supply destinations shown in FIG. 1 receive supply of power.
Figure 2B:
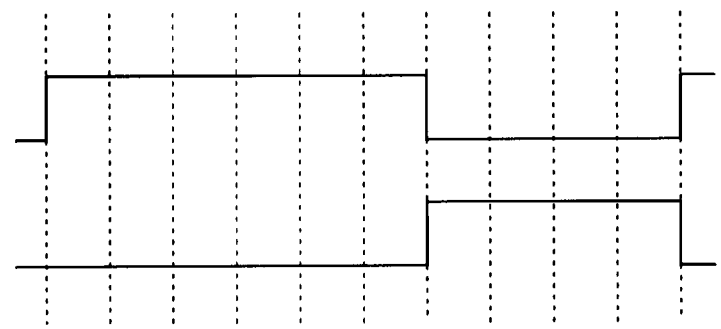
Figure 2C:
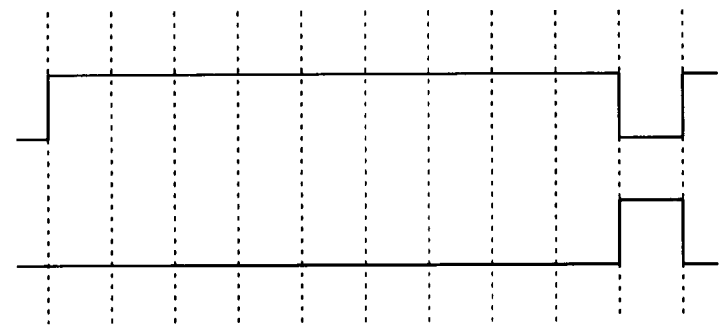

FIGS. 2A to 2C show an example of a particular mode of the contactless power supply system of the magnetic field resonance type of the present second embodiment where the power supply destination 2 and the power supply destination 3 receive supply of power from the power supplying source 1.

It is assumed that, in the contactless power supply system of the magnetic field resonance type of the present second embodiment, each power supply destination can set a priority degree for charging, for example, by percentage or ratio.

Also it is assumed that both of the priority degrees for charging of the power supply destinations 2 and 3 are, for example, 50%. In this instance, pulse signals for controlling the switch circuit 23 and the switch circuit 33 between on and off states in the power supply destination 2 and the power supply destination 3 such that the duty ratio is 50% and the periods within which the switch circuit 23 and the switch circuit 33 exhibit an on state do not overlap with each other.

Meanwhile, it is assumed that the priority degree for charging of the power supply destination 2 is 60% and the priority degree for charging of the power supply destination 3 is 40%. In this instance, a pulse signal for the switch circuit 23 having a duty ratio of 60% and a pulse signal for the switch circuit 33 having a duty ratio of 40% are generated such that the periods within which the switch circuit 23 and the switch circuit 33 alternately exhibit an on state may not overlap with each other as seen in FIG. 2B.

Further, it is assumed that the priority degree for charging of the power supply destination 2 is 90% and the priority degree for charging of the power supply destination 3 is 10%. In this instance, a pulse signal for the switch circuit 23 having a duty ratio of 90% and a pulse signal for the switch circuit 33 having a duty ratio of 10% are generated such that the periods within which the switch circuit 23 and the switch circuit 33 alternately exhibit an on state may not overlap with each other as seen in FIG. 2C.

In this manner, in the contactless power supply system of the present second embodiment, the periods within which the switch circuits 23 and 33 exhibit an on state are prevented from overlapping with each other. Consequently, when each power supply destination receives supply of power, it is possible to prevent the receiving amount of power from decreasing such that the power supply destination can receive power from the power supplying source 1 efficiently as intended to carry out charging.

Then, in order to prevent power supplying periods or power receiving periods of the power supply destinations from overlapping with each other as seen in FIGS. 2A to 2C, in the contactless power supply system of the second embodiment, each power supply destination can communicate with any other power supply destination so that a power supplying period can be set exclusively.

FIG. 3 shows an example of a configuration of the control circuit 25 for controlling the switch circuit 23 of the power supply destination 2 shown in FIG. 1 and the control circuit 35 for controlling the switch circuit 33 of the power supply destination 3.

Referring to FIG. 3, the control circuit 25 of the power supply destination 2 includes a CPU 251, a ROM 252, a RAM 253, an operation section 254, a short distance communication section 255 and a pulse generator 257 connected to each other by a CPU bus 258. Further, an antenna 256 for transmission and reception is connected to the short distance communication section 255.

The CPU 251 reads out and executes a program stored and retained in the ROM 252 to process information from the operation section 254 and the short distance communication section 255 and control the short distance communication section 255 and the pulse generator 257.

The ROM 252 stores programs to be executed by the CPU 251, data desired for processing and so forth therein. The RAM 253 is used principally as a working area for temporarily storing a temporary result of processing executed by the CPU 251.

Further, the operation section 254 in the present second embodiment has a function principally regarding a charging process of accepting an input of information from a user which indicates a priority degree of charging and notifying the CPU 251 of the inputted information.

The short distance communication section 255 can carry out short distance communication over approximately several tens centimeters and can communicate with a power supply destination positioned proximately through the antenna 256. Accordingly, the short distance communication section 255 receives information from the neighboring power supply destination and notifies the CPU 251 of the information or transmits the information to the neighboring power supply destination under the control of the CPU 251.

It is to be noted that the short distance communication section 255 is configured in compliance with such a standard as, for example, IEEE802.15, Bluetooth or ISO/IEC18092. Naturally, the short distance communication section 255 is not limited to that which complies with the standards mentioned but may be configured in compliance with any standard.

The pulse generator 257 generates a pulse signal for controlling the switch circuit 23 shown in FIG. 1 between on and off states under the control of the CPU 251. In particular, the pulse generator 257 generates a pulse signal for controlling such a switch circuit 23 as described hereinabove with reference to FIGS. 2A to 2C under the control of the CPU 251.

As shown in FIG. 3, also the control circuit 35 of the power supply destination 3 has a configuration similar to that of the control circuit 25 of the power supply destination 2. In particular, the control circuit 35 of the power supply destination 3 includes a CPU 351, a ROM 352 and a RAM 353 similar to the CPU 251, ROM 252 and RAM 253 of the control circuit 25 of the power supply destination 2 described hereinabove, respectively.

Further, an operation section 354, a short distance communication section 355, a transmission and reception antenna 356 and a pulse generator 357 of the control circuit 35 of the power supply destination 3 are configured similarly to the operation section 254, short distance communication section 255, antenna 256 and pulse generator 257, respectively. Further, a CPU bus 358 of the control circuit 35 of the power supply destination 3 connects the components to each other similarly to the CPU bus 258 of the control circuit 25 of the power supply destination 2.

The power supply destination 2 is placed on the power supplying source 1 after a priority degree regarding a charging process is inputted, for example, in percentage, through the operation section 254 to establish a charging mode. Similarly, the power supply destination 3 is placed on the power supplying source 1 after a priority degree regarding a charging process is inputted, for example, in percentage, through the operation section 354 to establish a charging mode.

Consequently, each of the CPU 251 of the power supply destination 2 and the CPU 351 of the power supply destination 3 executes a charging process program hereinafter described. Then, although details are hereinafter described, each of the CPUs 251 and 351 functions as a host apparatus and collects the priority degree of the other or different power supply destination.

Thereafter, the power supply destination which functions as a host apparatus determines what pulse signal should be produced by the power supply destination itself and the different power supply destination in response to the priority degrees of the power supply destination itself and the different power supply destination and notifies the power supply destination itself and the different power supply destination of the determined pulse signals. Further, the power supply destination notifies the power supply destination itself and the different power supply destination of pulse generation timings.

In this manner, each of the power supply destinations 2 and 3 can provide a period within which only the power supply destination itself can receive supply of power so that it can carry out charging appropriately.

Figure 4:
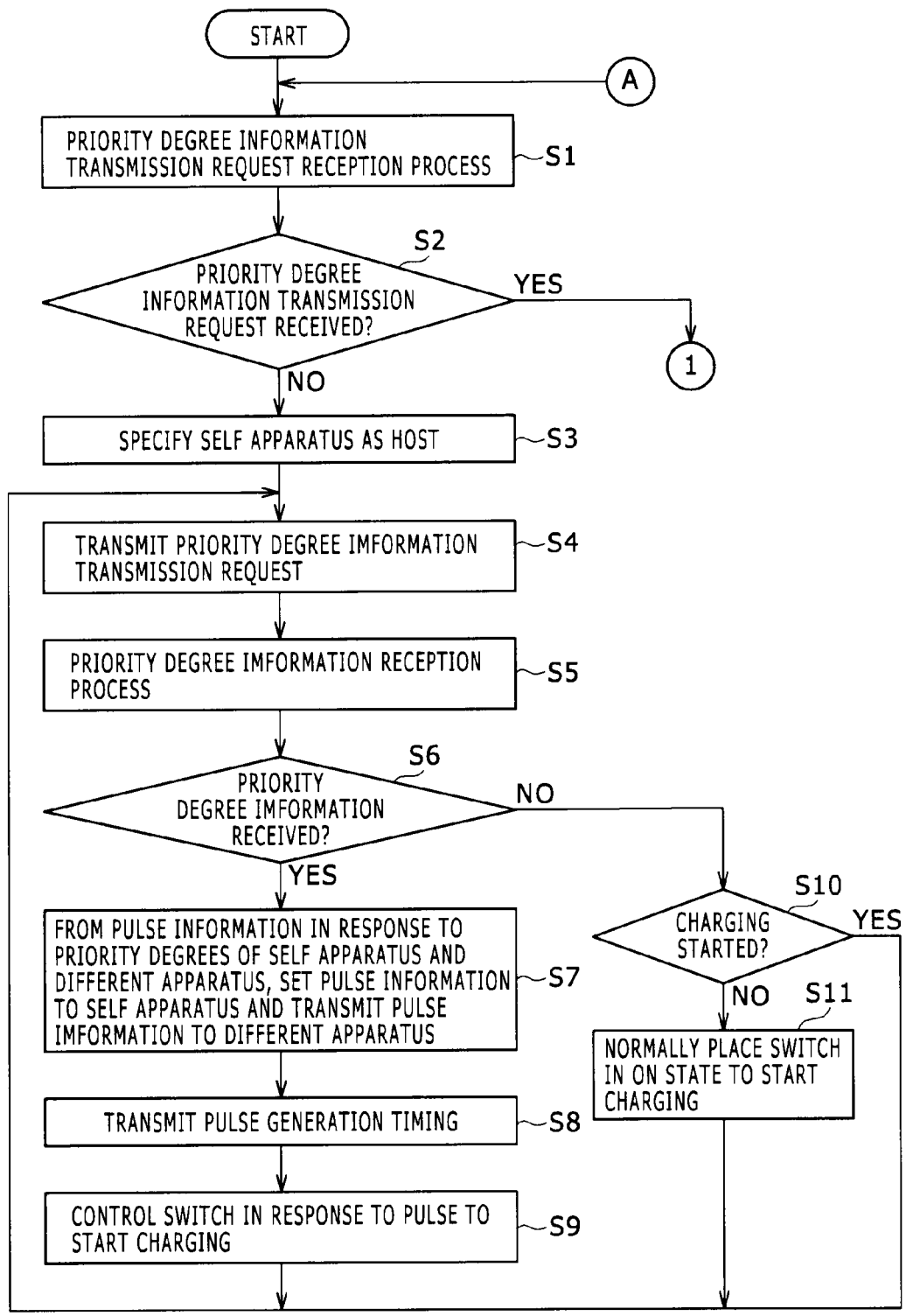
FIGS. 4 and 5 are flow charts illustrating details of a process carried out upon charging in the power supply destinations shown in FIG. 1.
Figure 5:
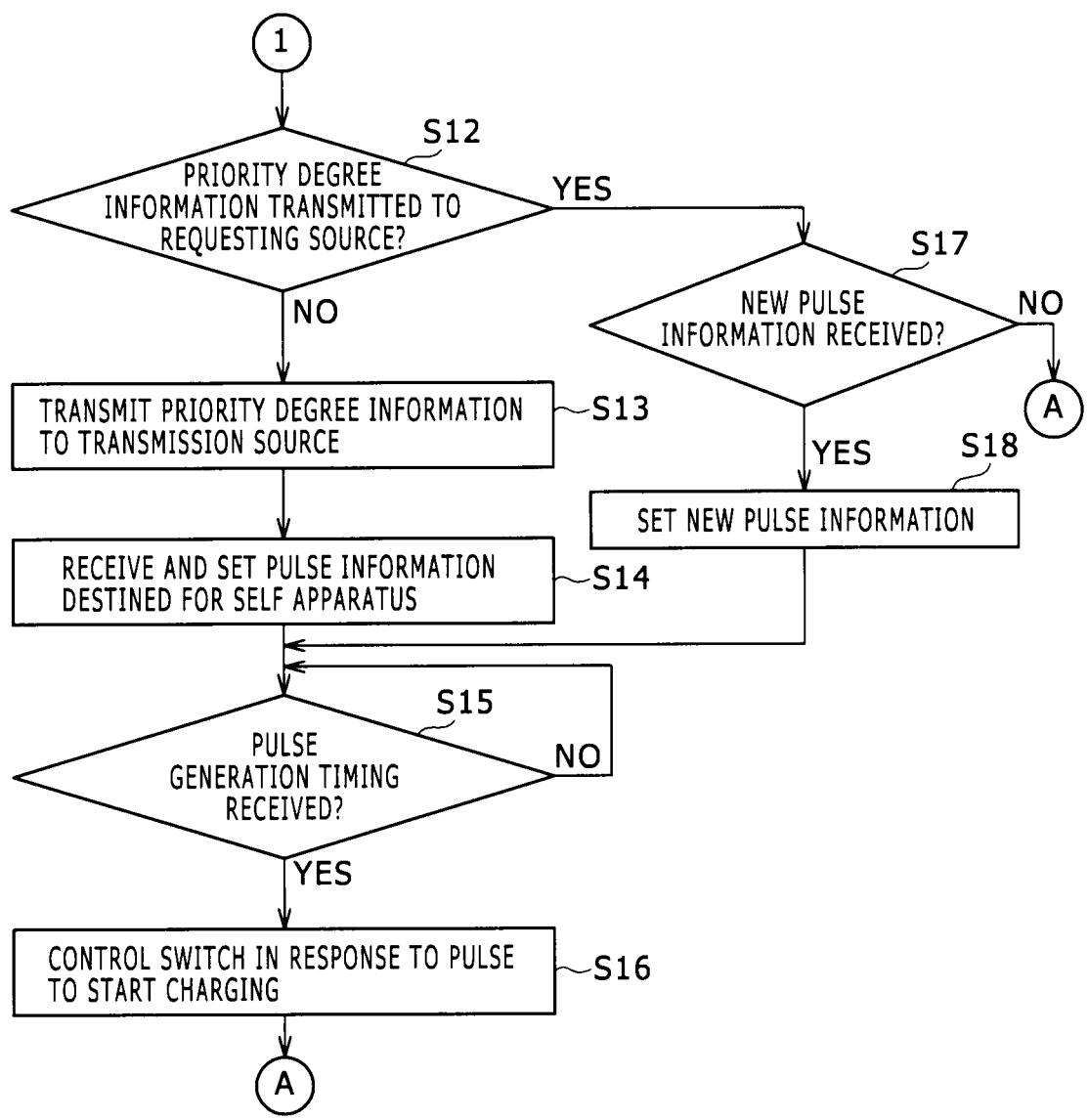

Now, details of processing carried out upon charging by the power supply destinations 2 and 3 in the present second embodiment are described with reference to flow charts of FIGS. 4 and 5. FIGS. 4 and 5 illustrate details of a process or a charging process program executed upon charging by each of the power supply destinations 2 and 3.

It is to be noted that, since the process illustrated in FIGS. 4 and 5 is carried out commonly by the power supply destinations 2 and 3, in order to simplify description, the following description is given taking the process where it is executed by the power supply destination 2 as an example.

If the power supply destination 2 accepts an operation for establishing a charging mode after it accepts an input of information representative of a priority degree for a charging process through the operation section 254, then the CPU 251 reads out the charging process program illustrated in FIGS. 4 and 5 and executes the charging process program.

Referring first to FIG. 4, the CPU 251 controls the short distance communication section 255 to carry out a process of receiving a priority degree information transmission request transmitted from any other power supply destination at step S1.

Then at step S2, the CPU 251 refers to the information from the short distance communication section 255 to decide whether or not a priority degree information transmission request is received. The decision process at step S2 decides whether or not there exists a different power supply destination which has become a host apparatus earlier than the power supply destination 2 itself.

If it is decided by the decision process at step S2 that a priority degree information transmission request has not received, then since a power supply destination which has become a host apparatus does not exist as yet, the CPU 251 specifies the power supply destination 2 itself as a host apparatus at step S3.

Then at step S4, the CPU 251 forms a priority degree information transmission request including, for example, identification information of the power supply destination 2 itself and transmits the formed priority degree information transmission request to any other power supply destination which may possibly exist in the proximity of the power supply destination 2 itself through the short distance communication section 255 and the antenna 256.

Then at step S5, the CPU 251 controls the short distance communication section 255 to carry out a reception process of priority degree information transmitted to the different power supply destination in response to the priority degree information transmission request transmitted at step S4.

Thereafter, the CPU 251 decides at step S6 whether or not priority degree information from any other power supply destination has been received. It is to be noted that the priority degree information from any other power supply destination includes identification information of the power supply destination of the transmission source and so forth.

If it is decided at step S6 that priority degree information from some other power supply destination has been received, then the CPU 251 generates pulse information of the power supply destination 2 itself and the different power supply destination and sets the pulse information to the power supply destination 2 itself and besides transmits the pulse information to the different power supply destination through the short distance communication section 255 at step S7.

In particular, at step S7, every time priority degree information from a new power supply destination is received, the CPU 251 generates pulse information for the power supply destination 2 itself and the new power supply destination based on the priority degree information of the power supply destination 2 itself, the priority degree information from the different power supply destination received already and the priority degree information of the new power supply destination received newly.

Further, at step S7, the pulse information for the power supply destination 2 itself is set to the power supply destination 2 itself, and the pulse information for the different power supply destination is transmitted to the corresponding power supply destination through the short distance communication section 255 and the antenna 256.

In other words, the CPU 251 generates pulse information of the power supply destination 2 itself and each different power supply destination, and sets the pulse information for the power supply destination 2 itself to the power supply destination 2 itself and transmits the pulse information of any other power supply destination to the corresponding power supply destination.

It is to be noted that the pulse information represents what pulse signal should be generated and particularly represents that a pulse signal of a duty ratio of 50% (wherein first five clocks are set to an on period and succeeding five clocks are set to an off period) should be generated as described hereinabove.

Thereafter, the CPU 251 controls the short distance communication section 255 to transmit information representative of a generation timing of the pulse signal at step S8. Then, also on the power supply destination 2 itself, the CPU 251 controls the pulse generator 257 at the timing to generate a pulse signal in response to the pulse signal for the power supply destination 2 itself and supplies the pulse signal to the switch circuit 23.

Consequently, the CPU 251 generates an appropriate pulse signal in response to the pulse information of the power supply destination 2 itself and controls the on/off switching of the switch circuit 23 to exclusively receive supply of power from the power supplying source 1 to start charging at step S9.

On the other hand, if it is decided by the decision process at step S6 that priority degree information from any other power supply destination is not received, then at step S10 the CPU 251 decides that there exists no other power supply destination than the power supply destination 2 itself and decides whether or not charging has been started already by the power supply destination 2 itself.

If it is decided by the decision process at step S10 that charging has not been started as yet, then the CPU 251 controls the pulse generator 257 to generate a signal exhibiting a normally-on state and supplies the signal to the switch circuit 23 so that the power supply destination 2 itself normally receives supply of power from the power supplying source 1 to carry out charging at step S11.

Then, if it is decided by the decision process at step S10 that charging has been started already after the process at step S9 or S11, then the CPU 251 repeats the processes at the steps beginning with step S4. Consequently, the power supply destination 2 can cope with a case wherein a new power supply destination is placed on the power supplying source 1.

In particular, where the processes at the steps beginning with step S4 are carried out repetitively, even if a new power supply destination is placed on the power supplying source 1, it is possible to take also the priority degree information of the new power supply destination into consideration to re-generate and deliver pulse information for the power supply destination 2 itself and the new power supply destination.

Consequently, even if the number of power supply destinations increases, it is possible to appropriately control the switch circuits of the power supply destinations in response to the priority degrees of the power supply destinations so that each of the power supply destinations can provide a period within which it exclusively receives supply of power from the power supplying source 1.

On the other hand, if it is decided by the decision process at step S2 that a priority degree information transmission request has been received, then since a power supply destination which becomes a host apparatus and transmits a priority degree information transmission request exists already, the processing advances to the process of FIG. 5.

Referring now to FIG. 5, the CPU 251 decides at step S12 whether or not the power supply destination 2 itself has already transmitted priority degree information of the power supply destination 2 itself to the requesting source which already is the host apparatus. The decision at step S12 can be carried out by retaining a transmission destination history of priority degree information such as a transmission destination, transmission time and so forth of transmission of priority degree information from the power supply destination 2 itself.

If it is decided by the decision process at step S12 that the priority degree information of the power supply destination 2 itself has not been transmitted to the requesting source as yet, then the CPU 251 controls the short distance communication section 255 to transmit, for example, the priority degree information of the power supply destination 2 itself set to the RAM 253 to the requesting source at step S13. It is to be noted that the priority degree information transmitted at step S13 includes necessary information such as identification information of the transmission source and so forth added thereto.

Thereafter, the CPU 251 receives pulse information destined for the power supply destination 2 itself transmitted from the host apparatus as hereinafter described in regard to the step S7 of FIG. 4 and sets the received pulse information to the RAM 253 of the power supply destination 2 itself at step S14. Then at step S15, the CPU 251 enters and remains in a waiting state until a pulse generation timing transmitted from the host apparatus is received as described hereinabove in connection with the step S8 of FIG. 4.

If it is decided by the decision process at step S15 that a pulse generation timing is received, then the CPU 251 controls, at step S16, the pulse generator 257 to generate a pulse to start charging in response to the pulse information set at step S14.

In particular, at step S16, a pulse signal is generated in response to the pulse information destined for the power supply destination 2 itself by the pulse generator 257 and is supplied to the switch circuit 23 so that the on/off operation of the switch circuit 23 is controlled such that, when the switch circuit 23 is on, the power supply destination 2 can receive supply of power to carry out charging.

After the process at step S16, the CPU 251 repeats the processes at the steps beginning with step S1 of FIG. 4 so that, taking also a case wherein the host apparatus completes its charging and is removed from the power supplying source 1 into consideration, charging in accordance with the priority degrees of the individual power supply destinations can normally be carried out appropriately.

If it is decided by the decision process at step S12 that the priority degree information of the power supply destination 2 has already been transmitted to the requesting source, then the CPU 251 decides at step S17 whether or not a new pulse information destined for the power supply destination 2 is received through the short distance communication section 255.

If it is decided by the decision process at step S17 that new pulse information destined for the power supply destination 2 is received, then the CPU 251 re-sets the new pulse information to the RAM 253 at step S18. Thereafter, the CPU 251 repeats the processes at the steps beginning with step S15.

On the other hand, if it is decided by the decision process at step S17 that new pulse information destined for the power supply destination 2 itself is not received, then since there is no necessity to change the host apparatus, the processes at the steps beginning with step S1 of FIG. 4 are repeated.

Where the processes described hereinabove with reference to FIGS. 4 and 5 are executed by the control sections of individual power supply destinations, the host apparatus can generate pulse information in response to the priority degrees regarding a charging process of the power supply destinations and distribute the pulse information to the power supply destinations.

Further, since the host apparatus supplies also a pulse generation timing, the generation timing of a pulse signal can be unified in the power supply destinations. Consequently, each power supply destination can provide a period within which only the power supply destination itself can exclusively receive supply of power and receive supply of power to carry out charging.

It is to be noted that, since usually users of individual power supply destinations to be placed on the power supplying source 1 are in most cases a single user, it is considered that setting of priority degrees of the individual apparatus is less likely to be mistaken. However, for example, if a plurality of power supply destinations have a priority degree of 100% or the total value of priority degrees of different power supply destinations exceeds 100%, then the power supply destination serving as a host apparatus may output warning sound and a warning message to urge the user to correct the priority degree setting.

Or, the power supply destination serving as a host apparatus may automatically correct the priority degrees of the power supply destinations based on the priority degrees of the power supply destinations without issuing a warning. For example, if each of a plurality of power supply destinations has the priority degree of 100%, generation timings of on/off periods of all apparatus may be made different from each other although they equally have on/off periods.

Further, where the total value of the priority degrees of power supply destinations exceeds 100%, it is possible to automatically adjust the priority degrees of the power supply destinations in response to the priority degrees of the power supply destinations so that the total value may not exceed 100%.

Further, in the process illustrated in FIGS. 4 and 5, it is taken into consideration that the host apparatus may be removed from the power supplying source 1 and some other power supply destination may become a new host apparatus and that a new power supply destination may be placed on the power supplying source 1. However, a power supply destination other than the host apparatus may possibly be removed from the power supplying source 1, for example, during charging.

Therefore, any other power supply destination than the host apparatus may periodically transmit the priority degree information of the power supply destination in response to a request from the host apparatus such that, when the host apparatus receives the priority degree information and detects that a change has occurred in terms of a power supply destination placed on the power supplying source 1, the host apparatus may re-produce pulse information.

In this manner, in the contactless power supply system of the second embodiment, different power supply destinations communicate with each other such that periods within which the power supply destinations receive supply of power may not overlap with each other. Consequently, each of the power supply destinations can receive supply of power from the power supplying source 1 in response to the priority degree of the power supply destination to carry out charging.

It is to be noted that the process described hereinabove with reference to FIGS. 4 and 5 is an example of processes wherein each power supply destination exclusively provides a power supply period and naturally it is possible to use various other methods. The important thing is that, where a plurality of power supply destinations are placed at a time on the power supplying source 1, various methods which make it possible for each of the power supply destinations to receive supply of power for an appropriate period in accordance with the priority degree to carry out charging appropriately without giving rise to decrease of the charging amount.

THIRD EMBODIMENT

In the contactless power supply systems of the first and second embodiments described above, a power supply destination itself which is, for example, a portable telephone terminal includes a resonance element, an excitation element, a switch circuit, a rectification circuit and a control circuit.

However, various existing portable apparatus which do not have the configuration described hereinabove for receiving supply of power in a contactless fashion are available. Therefore, a contactless power supply system of the present third embodiment is configured such that it includes a power supplying source 1 and a power supply destination 4 having a configuration of an adapter and power can be supplied from the power supply destination 4 to various portable apparatus.

As hereinafter described, power can be supplied to a plurality of portable apparatus through the power supply destination 4 having a configuration of an adapter. Further, the power supply destination 4 in the present third embodiment can set a priority degree regarding a charging process for each portable apparatus similarly as in the case of the second embodiment and can supply power to the portable apparatus or the like connected thereto in response to the priority degree.

Figure 6:
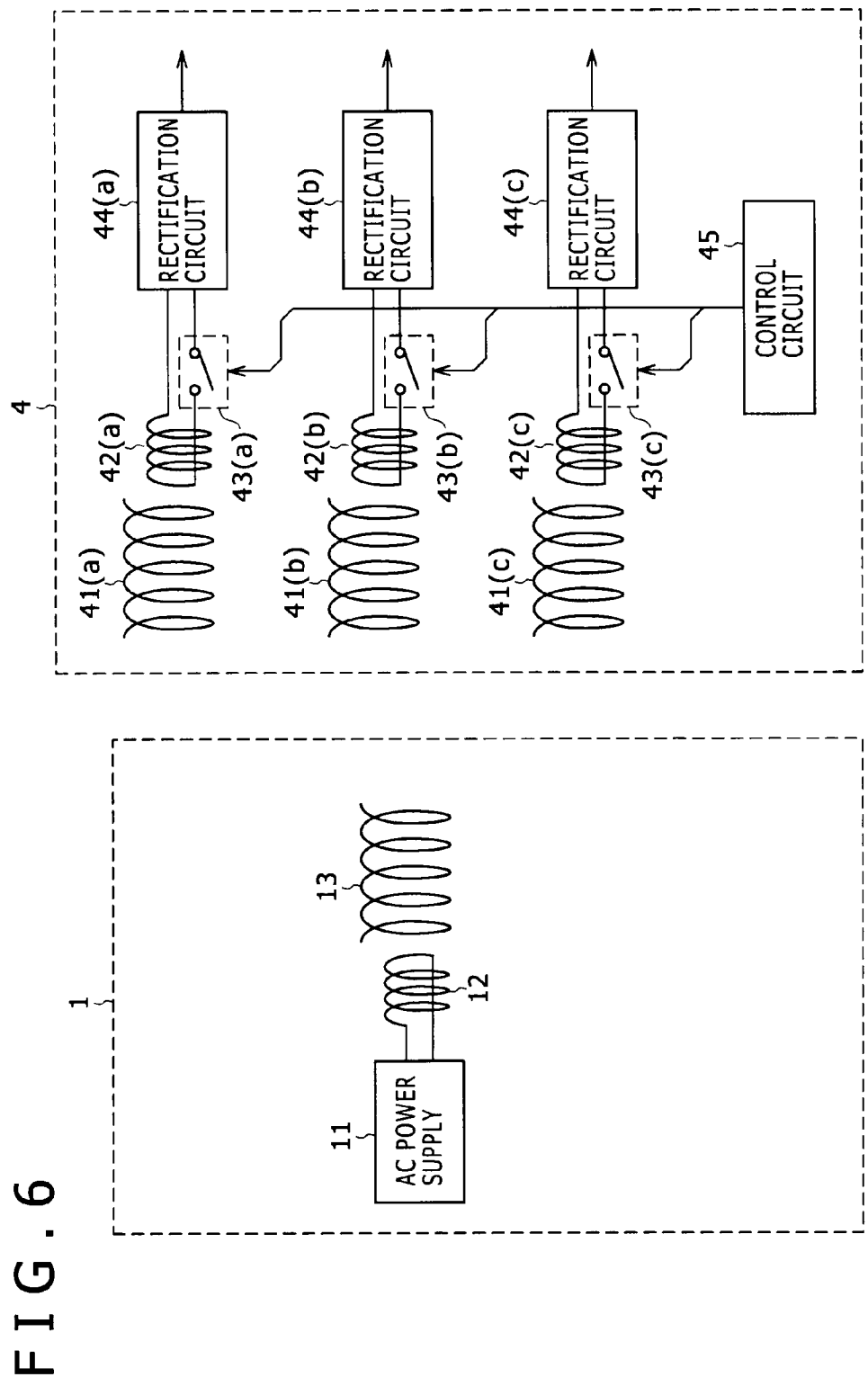
FIG. 6 is a diagrammatic view showing a contactless power supply system according to a third embodiment of the present invention.

FIG. 6 shows a contactless power supply system of the present third embodiment. Referring to FIG. 6, the power supplying source 1 is configured similarly to the power supplying source 1 in the first and second embodiments shown in FIG. 1.

Therefore, description of common components of the power supplying source 1 to those in the contactless power supply system of FIG. 1 is omitted herein to avoid redundancy.

Meanwhile, the power supply destination 4 in the present third embodiment includes three power supply systems. In particular, the first power supply system includes a resonance element 41(*a*), an excitation element 42(*a*), a switch circuit 43(*a*) and a rectification circuit 44(*a*).

The second power supply system includes a resonance element 41(*b*), an excitation element 42(*b*), a switch circuit 43(*b*) and a rectification circuit 44(*b*), and the third power supply system includes a resonance element 41(*c*), an excitation element 42(*c*), a switch circuit 43(*c*) and a rectification circuit 44(*c*).

The switch circuit 43(*a*) is interposed between the excitation element 42(*a*) and the rectification circuit 44(*a*). Similarly, the switch circuit 43(*b*) is interposed between the excitation element 42(*b*) and the rectification circuit 44(*b*), and the switch circuit 43(*c*) is interposed between the excitation element 42(*c*) and the rectification circuit 44(*c*).

The switch circuits 43(*a*), 43(*b*) and 43(*c*) can be controlled individually by a control section 45. Though not shown, the control section 45 includes a CPU, a ROM, a RAM, an operation section, a pulse signal generator and so forth similarly to the control circuit 25 and the control circuit 35 shown in FIG. 3.

Further, each of the resonance elements 41(*a*), 41(*b*) and 41(*c*) of the power supply destination 4 implements a function similar to that of the resonance element 21 of the power supply destination 2 and the resonance element 31 of the power supply destination 3 shown in FIG. 1.

Further, each of the excitation elements 42(*a*), 42(*b*) and 42(*c*) of the power supply destination 4 implements a function similar to that of the excitation element 22 of the power supply destination 2 and the excitation element 32 of the power supply destination 3 shown in FIG. 1.

Furthermore, each of the switch circuits 43(*a*), 43(*b*) and 43(*c*) of the power supply destination 4 implements a function similar to that of the switch circuit 23 of the power supply destination 2 and the switch circuit 33 of the power supply destination 3 shown in FIG. 1.

Further, each of the rectification circuits 44(*a*), 44(*b*) and 44(*c*) of the power supply destination 4 implements a function similar to that of the rectification circuit 24 of the power supply destination 2 and the rectification circuit 34 of the power supply destination 3 shown in FIG. 1.

To each of the rectification circuits 44(*a*), 44(*b*) and 44(*c*) of the power supply destination 4, any of various electric apparatus which desire charging of a battery such as a portable telephone terminal, a portable music reproduction machine or a portable game machine is connected.

To the control section 45, a priority degree regarding a charging process can be set for each electronic apparatus connected to the rectification circuit through an operation section not shown. For example, the priority degree can be set such that, for example, an electronic apparatus connected to the rectification circuit 44(*a*) has a priority degree of 60% and another electronic apparatus connected to the rectification circuit 44(*b*) has another priority degree of 30% while still another electronic apparatus connected to the rectification circuit 44(*c*) has a further priority degree of 10%.

In this instance, the control section 45 generates a pulse signal to be supplied from a pulse generator not shown to each of the switch circuits 43(*a*), 43(*b*) and 43(*c*) in response to the priority degree set for the switch circuit. The pulse signal generated is supplied to a corresponding one of the switch circuits 43(a), 43(b) and 43(c) at a timing under the control of the CPU of the control section 45.

Consequently, each of the switch circuits 43(a), 43(b) and 43(c) is controlled between on and off states by a pulse signal corresponding to the priority degree set by the user. Consequently, power from the power supplying source 1 can be supplied to the rectification circuits 44(a), 44(b) and 44(c) such that it is supplied within periods corresponding to the individual priorities which do not overlap with each other.

Accordingly, it is possible to provide a power supply period exclusively for an electronic apparatus connected to each of the rectification circuits 44(a), 44(b) and 44(c) similarly as in the second embodiment such that power is applied to carry out charging in a mode suitable for the assumed priority degree.

Besides, since the power supply destination 4 has a configuration of an adapter, there is no necessity to carry out communication between different electronic apparatus in a charging mode to carry out adjustment of the power supply periods in accordance with the priority degrees. Further, there is no necessity to unify the generation timings of pulse signals for controlling the power supplying timings through communication.

Further, since the power supply destination 4 having a configuration of an adapter is used, power can be supplied also to an electronic apparatus which does not have a configuration for implementing contactless power supply of the magnetic field resonance type. On the other hand, an electronic apparatus which has a configuration for implementing a contactless power supply system of the magnetic field resonance type can receive supply of power directly from the power supplying source 1 in the mode of the first or second embodiment shown in FIG. 1.

It is to be noted that, although it is described hereinabove that the power supply destination 4 shown in FIG. 6 has three power supply systems, the number of power supply systems which the power supply destination 4 has is not limited to three. Naturally, it is possible to provide a greater number of power supply systems in response to the shape or the size of the mounting table of the power supplying source 1.

Modifications

It is to be noted that, in the first to third embodiments described hereinabove, each power supply destination includes a switch circuit interposed between an excitation element and a rectification circuit as seen in FIGS. 1 and 6 and the switch circuit is controlled so as to provide a period within which supply of power from the power supplying source 1 is received and another period within which such supply of power is not received. However, the configuration for provision of such periods is not limited to this.

FIG. 7 shows another example of a configuration, that is, a modified configuration, for providing a period within which supply of power from a power supplying source is received and another period within which such supply of power is not received. Referring to FIG. 7, for example, a capacitor 26 and a switch circuit 27 are provided in a resonance element 21 of a power supply destination 2, and the switch circuit 27 is controlled between on and off states.

In this instance, if the switch circuit 27 is switched on, then the resonance frequency varies such that power supply from the power supplying source 1 may not be received by the power supply destination 2. On the contrary, if the switch circuit 27 is switched off, then a resonance relationship with the power supplying source 1 is established such that supply of power from the power supplying source 1 can be received by the power supply destination 2.

In this manner, as a technique for providing a period within which supply of power from a power supplying source 1 is received and another period within which such supply of power is not received, a method is available which utilizes variation of the resonance frequency of the resonance element as seen in FIG. 7.

Method of the Invention and Application to a Program

The power receiving method according to the embodiments of the present invention is applied to the method of controlling supply of power to a power supply destination from a power supplying source described hereinabove with reference to FIGS. 1 to 8, that is, the power receiving method.

In particular, the power receiving method for a contactless power receiving apparatus according to the embodiments of the present invention is a method which includes a step carried out by a resonance element, which has a resonance relationship with a resonance element of a power supplying source, of receiving AC power in a contactless fashion by resonance from the resonance element of the power supplying source, a step carried out by an excitation element of receiving the AC power from the resonance element of the contactless power receiving apparatus by electromagnetic induction, a step carried out by a changeover circuit of selectively permitting supply therethrough of the AC power received by the excitation element, and a step carried out by a rectification circuit of receiving the AC power when the supply of the AC power is permitted by the changeover circuit and generating AC power from the received AC power.

Also the method described hereinabove with reference to FIGS. 4 and 5 is one of methods according to the embodiments of the present invention.

Further, the control sections 25 and 35 have a configuration of a microcomputer, and the program for carrying out the process described hereinabove with reference to FIGS. 4 and 5 and executed by the control sections 25 and 35 is one of programs according to the embodiments of the present invention.

Others

It is to be noted that, in the embodiments described hereinabove, the description has been made taking a portable telephone set, a portable music player, a portable game machine and the like as a power supply destination. However, the embodiments of the present invention are not limited to them. For example, various electronic apparatus which desire charging can be made a power supply destination such as a digital still camera, a digital video camera and an electronic notebook.

Further, while, in the embodiments described hereinabove, power is supplied in a contactless fashion by a magnetic field resonance method. However, the embodiments of the present invention can also be applied to the cases where power is supplied in a contactless fashion using not only the magnetic field resonance method but also an electric field resonance method and an electromagnetic induction method.

The present application contains subject matter related to that disclosed in Japanese Priority Patent Application JP 2009-160360 filed in the Japan Patent Office on Jul. 7, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A contactless power receiving apparatus, comprising:
a resonance element operable to receive supply of alternating-current power in a contactless fashion by resonance from a resonance element of a power supplying source;
an excitation element operable to receive supply of said alternating-current power by electromagnetic induction from said resonance element;
a rectification circuit operable to generate direct-current power from said alternating-current power from said excitation element and output said direct-current power;
a control circuit operable to:
determine whether a request to transmit priority degree information is received;
transmit said request to one or more other contactless power receiving apparatuses in response to determining that said request is not received;
receive said priority degree information from said one or more other contactless power receiving apparatuses; and
transmit a pulse generation timing to said one or more other contactless power receiving apparatuses based on said received priority degree information; and
a changeover circuit operable to change over said alternating-current power between a supplied state and a non-supplied state to said rectification circuit based on said pulse generation timing,
wherein said contactless power receiving apparatus is operable to output a warning message when a total value of priority degrees of said contactless power receiving apparatus and said one or more other contactless power receiving apparatuses exceeds 100%.

2. The contactless power receiving apparatus according to claim 1, wherein said changeover circuit is interposed between said excitation element and said rectification circuit.

3. The contactless power receiving apparatus according to claim 1, wherein said changeover circuit includes a capacitor and a switch circuit connected to said resonance element which receives supply of said alternating-current power.

4. The contactless power receiving apparatus according to claim 1, wherein said control circuit is operable to:
accept an input for setting a priority degree regarding reception of power from a user;
control communication with said one or more other contactless power receiving apparatuses through short distance radio communication; and
control a changeover timing of said changeover circuit so that said contactless power receiving apparatus and said one or more other contactless power receiving apparatuses may not receive supply of power at a same time based on said pulse generation timing.

5. The contactless power receiving apparatus according to claim 1, wherein said resonance element of said power supplying source and said resonance element which receives supply of said alternating-current power from said resonance element of said power supplying source are connected to each other by magnetic field resonance.

6. The contactless power receiving apparatus according to claim 1, wherein said contactless power receiving apparatus is operable to output another warning message when a priority degree of said contactless power receiving apparatus exceeds 100%.

7. The contactless power receiving apparatus according to claim 1, wherein said priority degree information comprises identification information of said one or more other contactless power receiving apparatuses.

8. A contactless power receiving system, comprising:
one or more contactless power receiving apparatuses, wherein each of said one or more contactless power receiving apparatuses comprises:
a resonance element operable to receive supply of alternating-current power in a contactless fashion by resonance from a resonance element of a power supplying source;
an excitation element operable to receive supply of said alternating-current power by electromagnetic induction from said resonance element;
a rectification circuit operable to generate direct-current power from said alternating-current power from said excitation element and output said direct-current power;
a control circuit operable to:
determine whether a request to transmit priority degree information is received;
transmit said request to other of said one or more contactless power receiving apparatuses in response to determining that said request is not received;
receive said priority degree information from said other of said one or more contactless power receiving apparatuses; and
transmit a pulse generation timing to said other of said one or more contactless power receiving apparatuses based on said received priority degree information; and
a changeover circuit operable to change over said alternating-current power between a supplied state and a non-supplied state to said rectification circuit based on said pulse generation timing,
wherein each of said one or more contactless power receiving apparatuses is operable to output a warning message when a total value of priority degrees of said one or more contactless power receiving apparatuses exceeds 100%.

9. The contactless power receiving system according to claim 8, wherein said resonance element of said power supplying source and said resonance element which receives supply of said alternating-current power from said resonance element of said power supplying source are connected to each other by magnetic field resonance.

10. The contactless power receiving system according to claim 8, wherein each of said one or more contactless power receiving apparatuses is operable to accept an input from a user for setting a priority degree regarding reception of power.

11. The contactless power receiving system according to claim 8, wherein said power supplying source supplies power to said rectification circuit of each of said one or more contactless power receiving apparatuses during periods corresponding to individual priorities that do not overlap with each other.

12. The contactless power receiving system according to claim 6, wherein each of said one or more contactless power receiving apparatuses is operable to output another warning message when a priority degree of said each of said one or more contactless power receiving apparatuses exceeds 100%.

13. The contactless power receiving system according to claim 6, wherein said priority degree information comprises identification information of said other of said one or more other contactless power receiving apparatuses.

14. A power receiving method for a contactless power receiving apparatus, the method comprising:
- receiving alternating-current power in a contactless fashion by resonance from a resonance element of a power supplying source,
- wherein said alternating-current power is received by electromagnetic induction;
- determining whether a request to transmit priority degree information is received;
- transmitting said request to one or more other contactless power receiving apparatuses in response to determining that said request is not received;
- receiving said priority degree information from said one or more other contactless power receiving apparatuses;
- transmitting a pulse generation timing to said one or more other contactless power receiving apparatuses based on said received priority degree information;
- controlling a changeover circuit for selectively permitting supply therethrough of said received alternating-current power based on said pulse generation timing; and
- receiving said alternating-current power when said supply of said alternating-current power is permitted by said changeover circuit and generating direct-current power from said received alternating-current power,
- wherein said contactless power receiving apparatus is operable to output a warning message when a total value of priority degrees of said contactless power receiving apparatus and said one or more other contactless power receiving apparatuses exceeds 100%.

15. A contactless power supply system, comprising:
- a contactless power supplying apparatus comprising:
  - a resonance element operable to supply alternating-current power in a contactless fashion by resonance;
  - an excitation element operable to supply alternating-current power to said resonance element by electromagnetic induction; and
  - an alternating-current power supply section operable to generate alternating-current power of a frequency corresponding to a resonance frequency of said resonance element and supply said generated alternating-current power to said excitation element; and
- a contactless power receiving apparatus comprising:
  - a resonance element operable to receive supply of said alternating-current power in said contactless fashion by resonance from said resonance element of said contactless power supplying apparatus;
  - an excitation element operable to receive supply of said alternating-current power by electromagnetic induction from said resonance element of said contactless power receiving apparatus;
  - a rectification circuit operable to generate direct-current power from said alternating-current power from said excitation element of said contactless power receiving apparatus and output said direct-current power;
  - a control circuit operable to:
    - determine whether a request to transmit priority degree information is received;
    - transmit said request to one or more other contactless power receiving apparatuses in response to determining that said request is not received;
    - receive said priority degree information from said one or more other contactless power receiving apparatuses;
    - transmit a pulse generation timing to said one or more other contactless power receiving apparatuses based on said received priority degree information; and
  - a changeover circuit operable to change over said alternating-current power between a supplied state and a non-supplied state to said rectification circuit based on said pulse generation timing,
  - wherein said contactless power receiving apparatus is operable to output a warning message when a total value of priority degrees of said contactless power receiving apparatus and said one or more other contactless power receiving apparatuses exceeds 100%.

* * * * *